(12) United States Patent
Huang et al.

(10) Patent No.: US 11,861,085 B2
(45) Date of Patent: Jan. 2, 2024

(54) TOUCH PANEL AND TOUCH DISPLAY DEVICE

(71) Applicant: HUIZHOU CHINA STAR OPTOELECTRONICS TECHNOLOGY CO., LTD., Huizhou (CN)

(72) Inventors: Dongchen Huang, Huizhou (CN); Chingyuan Cheng, Huizhou (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 708 days.

(21) Appl. No.: 16/964,083

(22) PCT Filed: Jul. 9, 2020

(86) PCT No.: PCT/CN2020/101061
§ 371 (c)(1),
(2) Date: Jul. 22, 2020

(87) PCT Pub. No.: WO2021/248604
PCT Pub. Date: Dec. 16, 2021

(65) Prior Publication Data
US 2023/0107836 A1    Apr. 6, 2023

(30) Foreign Application Priority Data
Jun. 12, 2020  (CN) .......................... 202010536339.9

(51) Int. Cl.
G06F 3/041    (2006.01)
G06F 3/044    (2006.01)
G02F 1/1333   (2006.01)

(52) U.S. Cl.
CPC ........ G06F 3/0412 (2013.01); G02F 1/13338 (2013.01); G06F 3/0446 (2019.05); *G02F 2202/14* (2013.01)

(58) Field of Classification Search
CPC ... G06F 3/0412; G06F 3/0446; G02F 1/13338
(Continued)

(56) References Cited

U.S. PATENT DOCUMENTS

2010/0315385 A1\* 12/2010 Gan ........................ G06F 3/043
345/179
2016/0328082 A1\* 11/2016 Argiro ................ G06F 3/04162
(Continued)

FOREIGN PATENT DOCUMENTS

CN    104503635 A    4/2015
CN    204945980 U    1/2016
(Continued)

OTHER PUBLICATIONS

Yang Guangming Electronic device and control method thereof Jan. 11, 2019 Oppo Guangdong Mobile Telecommunications Co Ltd CN109189261 (A) paragraphs 49-67 English.\*
(Continued)

*Primary Examiner* — Prabodh M Dharia
(74) *Attorney, Agent, or Firm* — PV IP PC; Wei Te Chung; Zhigang Ma

(57) ABSTRACT

A touch panel is disclosed. The touch panel includes a substrate, a touch layer positioned on the substrate, and a photochromic layer positioned on the touch layer. The photochromic layer includes a photosensitive resistor layer positioned on the touch layer and connecting to the touch layer, and a color-changing cathode layer, positioned on the photosensitive resistor layer.

18 Claims, 2 Drawing Sheets

(58) Field of Classification Search
USPC .................................. 345/174, 179; 524/495
See application file for complete search history.

(56) References Cited

U.S. PATENT DOCUMENTS

| | | | |
|---|---|---|---|
| 2018/0076256 A1* | 3/2018 | Jiang | ............... G02F 1/13338 |
| 2018/0300007 A1* | 10/2018 | Xu | .................. G06F 3/0445 |
| 2020/0098836 A1* | 3/2020 | Song | ................. H10K 59/351 |
| 2020/0335060 A1* | 10/2020 | Xiao | ..................... G09G 3/20 |
| 2021/0356773 A1* | 11/2021 | Guo | ............... G02F 1/133514 |

FOREIGN PATENT DOCUMENTS

| | | | |
|---|---|---|---|
| CN | 105511196 | A | 4/2016 |
| CN | 106484197 | A | 3/2017 |
| CN | 107037926 | A | 8/2017 |
| CN | 109189261 | A | 1/2019 |
| CN | 110794613 | A | 2/2020 |
| EP | 0673521 | A1 | 9/1995 |
| KR | 20200045776 | A | 5/2020 |
| WO | 2020079992 | A1 | 4/2020 |

OTHER PUBLICATIONS

Yang Guangming Electronic device and control method thereof Jan. 11, 2019 Oppo Guangdong Mobile Telecommunications Co Ltd CN109189261 (A) paragraphs 49-67 Chinese.*
International Search Report issued in Application No. PCT/CN2020/101061, dated Mar. 8, 2021 (6 pages).
Written Opinion issued in Application No. PCT/CN2020/101061, dated Mar. 8, 2021 (3 pages).

* cited by examiner

TOUCH PANEL AND TOUCH DISPLAY DEVICE

FIELD OF THE INVENTION

The present invention relates to a display technique, and more particularly, to a touch panel and a touch display device.

BACKGROUND

Huge-size liquid crystal display (LCD) displays have been widely used and the touch display becomes a focus in this industry. For example, a display having an electronic whiteboard is desired especially in a meeting scenario or in an education scenario with ambient light. The non-contact-type touch function with huge view angle is desired to achieve the function of laser pen effect for the teacher to point out the location on the electronic whiteboard.

However, the conventional television (TV) display module cannot realize the non-contact-type touch effect.

SUMMARY

Technical Solution

One objective of an embodiment of the present invention is to provide a touch panel and a touch display device, to realize the non-contact-type touch control function.

According to an embodiment of the present invention, a touch panel is disclosed. The touch panel comprises: a substrate; a touch layer, positioned on the substrate; and a photochromic layer, positioned on the touch layer. The photochromic layer comprises: a photosensitive resistor layer, positioned on the touch layer and connecting to the touch layer; and a color-changing cathode layer, positioned on the photosensitive resistor layer.

In some embodiments, the touch layer comprises a plurality of transmitter (Tx) electrodes and a plurality of receiver (Rx) electrodes, the transmitter electrodes and the receiver electrodes arranged in a crisscross pattern on the substrate, the photochromic layer positioned on the transmitter electrodes and connected to the transmitter electrodes, and an orthographic projection of the photochromic layer on the substrate is not overlapped with an orthographic projection of the receiver electrodes on the substrate.

In some embodiments, the photosensitive resistor layer comprises a plurality of photosensitive resistors, positioned in areas between the receiver electrodes and on the transmitter electrodes; the color-changing cathode layer comprises a plurality of color-changing cathodes; and each of the photosensitive resistors corresponds to one color-changing cathode of the color-changing cathodes.

In some embodiments, the photosensitive resistors are positioned in the areas between the receiver electrodes as a matrix, and the transmitter electrodes, the photosensitive resistors and the color-changing cathodes are stacked.

In some embodiments, a material of the photochromic layer is a ultraviolet (UV) photochromic material or an infrared photochromic material.

In some embodiments, the UV photochromic material is zinc oxide, an alloy of zinc oxide and magnesium, cadmium sulfide or cadmium selenide.

In some embodiments, the infrared photochromic material is a lead sulfide, lead telluride, lead selenide or indium antimonide.

In some embodiments, the color-changing cathode layer is transparent in its normal state.

In some embodiments, a material of the color-changing cathode layer is tungsten oxide or viologen derivatives.

According to an embodiment of the present invention, a touch display device is disclosed. The touch display device comprises a display panel, a backlight module and the above-mentioned touch panel. The touch panel and the backlight module are respectively positioned on both sides of the display panel.

Advantageous Effect

An embodiment of the present invention has the photochromic layer. The photochromic layer is positioned on the touch layer and comprises the photosensitive resistor layer and the color-changing cathode layer. The photosensitive resistor layer in the photochromic layer changes its resistance when specific light is applied on the photosensitive resistor layer. This changes the voltage of the color-changing cathode layer and thus the color-changing cathode layer becomes a specific color. In this way, the light passing through the color-changing cathode layer becomes that specific color. This realizes the display effect of showing a specific color in response to a non-contact-type touch in the touch display device.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF PREFERRED EMBODIMENTS

Figure 1:
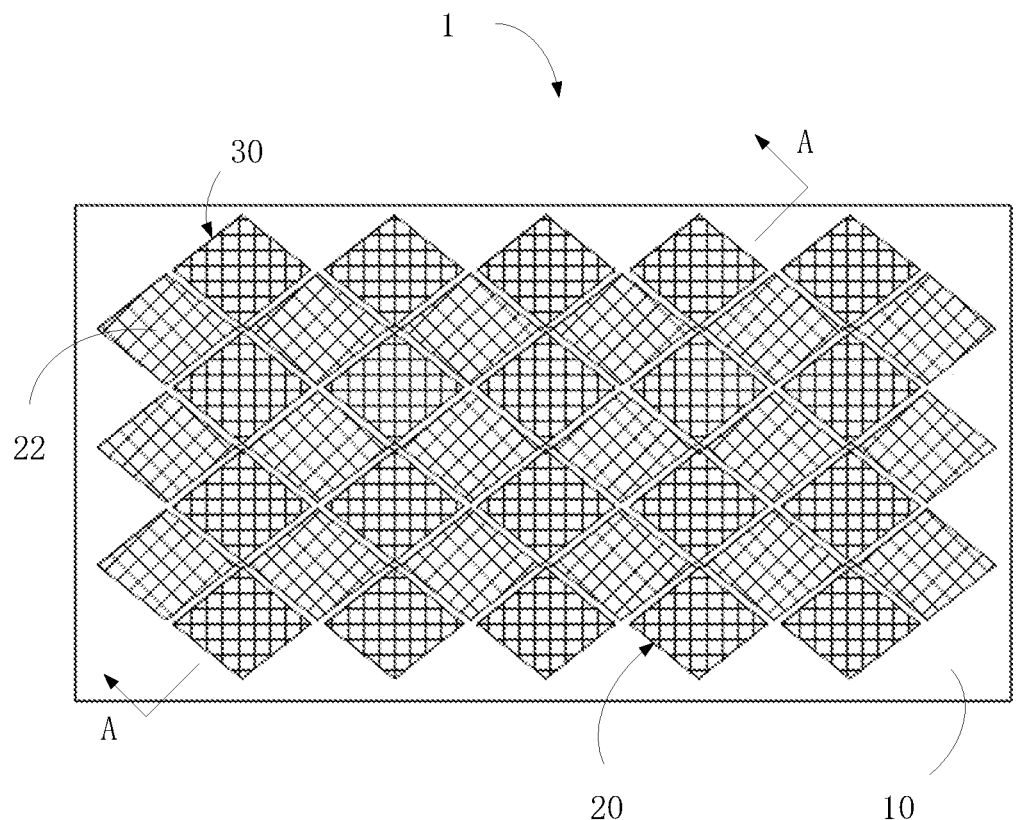
FIG. 1 is a top view of a touch panel according to an embodiment of the present invention.

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

All of the terminologies containing one or more technical or scientific terminologies have the same meanings that persons skilled in the art understand ordinarily unless they are not defined otherwise. For example, "arrange," "couple," and "connect," should be understood generally in the embodiments of the present disclosure. For example, "firmly connect," "detachably connect," and "integrally connect" are all possible. It is also possible that "mechanically connect," "electrically connect," and "mutually communicate" are used. It is also possible that "directly couple," "indirectly couple via a medium," and "two components mutually interact" are used.

All of the terminologies containing one or more technical or scientific terminologies have the same meanings that persons skilled in the art understand ordinarily unless they are not defined otherwise. For example, "upper" or "lower" of a first characteristic and a second characteristic may include a direct touch between the first and second characteristics. The first and second characteristics are not directly touched; instead, the first and second characteristics are touched via other characteristics between the first and second characteristics. Besides, the first characteristic arranged on/above/over the second characteristic implies that the first characteristic arranged right above/obliquely above or merely means that the level of the first characteristic is higher than the level of the second characteristic. The first characteristic arranged under/below/beneath the second characteristic implies that the first characteristic arranged right under/obliquely under or merely means that the level of the first characteristic is lower than the level of the second characteristic.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

Figure 2:
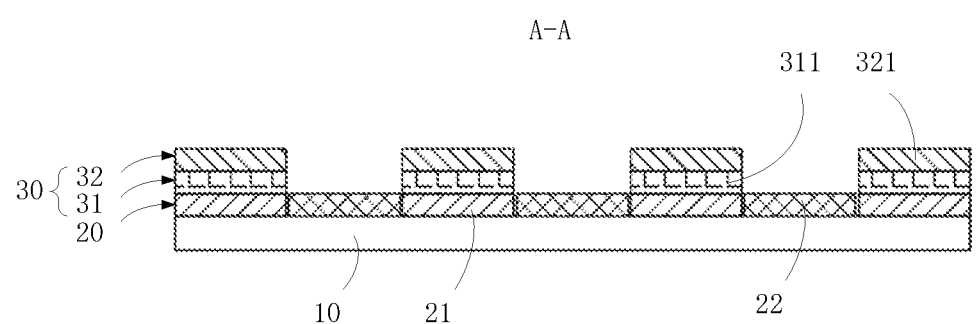
FIG. 2 is a diagram of a cross-section along the A-A direction shown in FIG. 1.

Please refer to FIG. 1 and FIG. 2. FIG. 1 is a top view of a touch panel according to an embodiment of the present invention. FIG. 2 is a diagram of a cross-section along the A-A direction shown in FIG. 1. As shown in FIG. 1 and FIG. 2, a display panel 1 is disclosed. The display panel 1 comprises a substrate 10 and a photochromic layer 30. A touch layer 20 is positioned on the substrate 10. The photochromic layer 30 is positioned on the touch layer. The photochromic layer 30 comprises a photosensitive resistor layer 31 and a color-changing cathode layer 32. The photosensitive resistor layer 31 is positioned on the touch layer 20 and connecting to the touch layer 20. The color-changing cathode layer 32 is positioned on the photosensitive resistor layer 31.

As previously mentioned, a display having an electronic whiteboard is desired especially in a meeting scenario or in an education scenario with ambient light. The non-contact-type touch function with huge view angle is desired to achieve the function of laser pen effect for the teacher to point out the location on the electronic whiteboard. However, the conventional TV display module cannot realize the non-contact-type touch effect. In this embodiment, the photochromic layer 30 is positioned on the touch layer 20 and comprises the photosensitive resistor layer 31 and the color-changing cathode layer 32. The photosensitive resistor layer 31 in the photochromic layer 30 changes its resistance when specific light is applied on the photosensitive resistor layer 31. This changes the voltage of the color-changing cathode layer 32 and thus the color-changing cathode layer 32 becomes a specific color. In this way, the light passing through the color-changing cathode layer 32 becomes that specific color. This realizes the display effect of showing a specific color in response to a non-contact-type touch in the touch display device.

The photochromic layer 30 and the touch layer 20 constitute a photochromic device. The color-changing cathode layer 32 in the photochromic layer 30 could be regarded as a cathode of the photochromic device. The photosensitive resistor layer 31 in the photochromic layer 30 could be regarded as the photochromic resistor. The touch layer 20 could be regarded as an anode. The touch layer 20 not only has the touch function but also could be used as an anode to realize the non-contact-type touch function. Specifically, at least a part of the touch layer 20 could be used in a multiplexing way in the non-contact-type touch circuit and the conventional contact-type touch circuit. Apparently, this structure could reduce the thickness of the touch panel 1 and makes the touch panel 1 more compacted.

In an embodiment, as shown in FIG. 2, the touch layer 20 comprises a plurality of transmitter (Tx) electrodes 21 and a plurality of receiver (Rx) electrodes 22. The transmitter electrodes 21 and the receiver electrodes 22 are arranged in a crisscross pattern on the substrate 10. The photochromic layer 30 is positioned on the Tx electrodes 21 and connected to the Tx electrodes 21. The orthographic projection of the photochromic layer 30 on the substrate 10 is not overlapped with the orthographic projection of the Rx electrodes 22 on the substrate 10. It could be understood that, in the touch layer 20, the Rx electrodes 22 are used to receive an external touch signal to sense an external touch event.

As previously mentioned, the photochromic layer 30 is positioned on the Tx electrodes 21 and connected to the Tx electrodes 21. The orthographic projection of the photochromic layer 30 on the substrate 10 is not overlapped with the orthographic projection of the Rx electrodes 22 on the substrate 10. This arrangement could well prevent the photochromic layer 30 from being blocked by the Rx electrodes 22 such that the touch display function of the touch layer 20 is not influenced. In this way, the touch display function and the non-contact-type touch display function could be well integrated in the touch panel 1. In addition, because the photochromic layer 30 is positioned on the Tx electrodes 21 and connected to the Tx electrodes 21, the Tx electrodes 21 could be used in a multiplexing way in the non-contact-type touch circuit and the contact-type touch circuit.

In the touch layer 20, the Tx electrodes 21 and the Rx electrodes 22 could be positioned in the same layer or in different layers. When the Tx electrodes 21 and the Rx electrodes 22 are positioned in the different layers, an insulating layer could be further included in the touch layer 20. The Tx electrodes 21 and the Rx electrodes 22 are respectively positioned on the two sides of the insulating layer. Specifically, when the Tx electrodes 21 are positioned above the insulating layer and the Rx electrodes 22 are positioned under the insulating layer, the photochromic layer 30 could be directly positioned on the Tx electrodes 21. When the Tx electrodes 21 are positioned under the insulating layer and the Rx electrodes 22 are positioned above the insulating layer, the photochromic layer 30 could be positioned on the insulating layer and between Rx electrodes 22. In this embodiment, the photochromic layer 30 could be connected to the Tx electrodes 21 through vias. The detailed structure is omitted here for simplicity.

In an embodiment, as shown in FIG. 2, the photosensitive resistor layer 31 comprises a plurality of photosensitive resistors 311, positioned in areas between the Rx electrodes 22 and on the Tx electrodes 21. The color-changing cathode layer 32 comprises a plurality of color-changing cathodes 321. Each of the photosensitive resistors 311 corresponds to one color-changing cathode 321 of the color-changing cathodes 321. The photosensitive resistors 311 are positioned in the areas between the Rx electrodes 22 as a matrix, and the Tx electrodes 21, the photosensitive resistors 311 and the color-changing cathodes 321 are stacked. In this embodiment, each photosensitive resistor 311 and each color-changing cathode 321 are distributed in the display panel in a one-to-one correspondence. This allows the photosensitive resistor layer 31 to accurately sense the position of the touch panel 1 where a specific light is applied on and to change to a specific color through the color-changing cathodes 321. In this way, the light passing through the color-changing cathodes 321 becomes the specific color as well such that the display effect of showing a specific color on the triggered potion of the touch panel 1 in response to a non-contact-type touch in the touch display device could be realized. Other positions of the touch panel 1 do not have any response because the specific light is not applied on those positions. In an embodiment, some of the Tx electrodes 21 could have the photosensitive resistors 311 on them. In another embodiment, all of the Tx electrodes 21 could have the photosensitive resistors 311 on them. In addition, in an embodiment, the orthogonal projection of the photosensitive resistor 311 on the substrate 10 could completely cover the orthogonal projection of the Tx electrode 21 on the substrate 10. In another embodiment, the orthogonal projection of the photosensitive resistor 311 on the substrate 10 could partially cover the orthogonal projection of the Tx electrode 21 on the substrate 10. This could be adjusted according to the actual demands. In this embodiment, the orthogonal projection of the photosensitive resistor 311 on the substrate 10 completely covers the orthogonal projection of the Tx electrode 21 on the substrate 10. This could maximize the area of the photosensitive resistor 311 such that the photosensitive resistor 311 could more easily receive the external specific light and be triggered accordingly to change its resistance.

In an embodiment, the material of the photochromic layer is a ultraviolet (UV) photochromic material or an infrared photochromic material. In the actual implementation, the photosensitive resistor layer 31 changes its resistance when it's lightened by the specific light. Here, when the material of the photochromic layer 31 is a UV photochromic material, the specific light is a UV light. When the material of the photochromic layer 31 is an infrared photochromic material, the specific light is an infrared. In addition, the UV photochromic material is zinc oxide, an alloy of zinc oxide and magnesium, cadmium sulfide or cadmium selenide. The infrared photochromic material is a lead sulfide, lead telluride, lead selenide or indium antimonide.

In this embodiment, the material of the photochromic layer 31 is a UV photochromic material. Specifically, the UV photochromic material is zinc oxide or an alloy of zinc oxide and magnesium. Thus, the photochromic layer 31 is transparent. Furthermore, the amount of magnesium of the alloy of zinc oxide and magnesium could be adjusted to change the targeted UV light wavelength that the photosensitive resistor layer 31 could sense. By adopting zinc oxide or an alloy of zinc oxide and magnesium as the material of the photochromic layer 31, the photochromic layer 31 is transparent to prevent from blocking light and influencing the aperture rate of the touch display device.

In an embodiment, the color-changing cathode layer 32 is transparent in its normal stage. Here, the material of the color-changing cathode layer 32 could be an organic photochromic material or an inorganic photochromic material. In this embodiment, the normal state of the color-changing cathode layer 32 is set to be transparent. Specifically, the material of the color-changing cathode layer is tungsten oxide or viologen derivatives such that the normal state of the color-changing cathode layer 32 is transparent. In the actual implementation, the transparent color-changing cathode layer 32 could prevent from blocking light and influencing the aperture rate of the touch display device. Furthermore, the photosensitive resistor layer 31 changes its resistance when the specific light is applied on the photosensitive resistor layer 31. This changes the voltage of the color-changing cathode layer 32 and thus the color-changing cathode layer 32 becomes a specific color. Here, the specific color could be selected according to the selected material. For example, when the material of the color-changing cathode layer 32 is a tungsten oxide ($WO_3$) of an inorganic photochromic material, the specific color is deep blue. That is, when the specific light is applied on the photosensitive resistor layer 31, the photosensitive resistor layer 31 changes its resistance and the color of the tungsten oxide becomes deep blue because the voltage of the color-changing cathode layer 32 changes.

Figure 3:
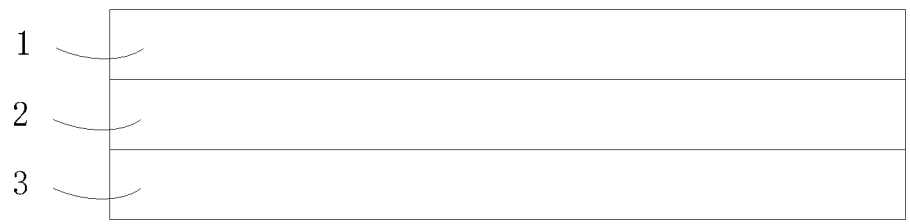
FIG. 3 is a diagram of a touch display device according to an embodiment of the present invention.

According to an embodiment of the present invention, a touch display device is disclosed. As shown in FIG. 3, the touch display device comprises a display panel 2, a backlight module, and the above-mentioned touch panel 1. The touch panel 1 and the backlight module 3 are respectively positioned on both sides of the display panel 2. The photosensitive resistor layer 31 changes its resistance when the specific light (such as UV light) is applied on it. This changes the voltage of the color-changing cathode layer 32 and the color-changing cathode layer 32 becomes a specific color. In this way, the light passing through the color-changing cathode layer 32 becomes the specific color as well. This realizes the display effect of showing a specific color in response to a non-contact-type touch in the touch display device. In addition, the operations of the display device in this embodiment are similar to those of the display panel 2 and further illustrations are omitted here for simplicity.

From the above, the touch panel 1 comprises a substrate 10, a touch layer 20 and a photochromic layer 30. The touch layer 20 is positioned on the substrate 10. The photochromic layer 30 is positioned on the touch layer. The photochromic layer 30 comprises a photosensitive resistor layer 31 and a color-changing cathode layer 32. The photosensitive resistor layer 31 is positioned on the touch layer 20 and connecting to the touch layer 20. The color-changing cathode layer 32 is positioned on the photosensitive resistor layer 31. The photosensitive resistor layer 31 in the photochromic layer 30 changes its resistance when specific light is applied on the photosensitive resistor layer 31. This changes the voltage of the color-changing cathode layer 32 and thus the color-changing cathode layer becomes a specific color 32. In this way, the light passing through the color-changing cathode layer 32 becomes that specific color. This realizes the display effect of showing a specific color in response to a non-contact-type touch in the touch display device.

Above are embodiments of the present invention, which does not limit the scope of the present invention. Any modifications, equivalent replacements or improvements within the spirit and principles of the embodiment described above should be covered by the protected scope of the invention.

What is claimed is:

1. A touch panel, comprising:
   a substrate;
   a touch layer, positioned on the substrate and comprising a plurality of transmitter (Tx) electrodes and a plurality of receiver (Rx) electrodes; and
   a photochromic layer, positioned on the transmitter electrodes and connected to the transmitter electrodes, comprising:
      a photosensitive resistor layer, positioned on the transmitter electrodes and connecting to the touch layer; and
      a color-changing cathode layer, positioned on the photosensitive resistor layer,
      wherein an orthographic projection of the photochromic layer on the substrate is not overlapped with an orthographic projection of the receiver electrodes on the substrate.

2. The touch panel of claim 1, wherein the transmitter electrodes and the receiver electrodes arranged in a crisscross pattern on the substrate.

3. The touch panel of claim 2, wherein the photosensitive resistor layer comprises a plurality of photosensitive resistors, positioned in areas between the receiver electrodes and on the transmitter electrodes; the color-changing cathode layer comprises a plurality of color-changing cathodes; and each of the photosensitive resistors corresponds to one color-changing cathode of the color-changing cathodes.

4. The touch panel of claim 3, wherein the photosensitive resistors are positioned in the areas between the receiver electrodes as a matrix, and the transmitter electrodes, the photosensitive resistors and the color-changing cathodes are stacked.

5. The touch panel of claim 1, wherein a material of the photochromic layer is a ultraviolet (UV) photochromic material or an infrared photochromic material.

6. The touch panel of claim 5, wherein the UV photochromic material is zinc oxide, an alloy of zinc oxide and magnesium, cadmium sulfide or cadmium selenide.

7. The touch panel of claim 5, wherein the infrared photochromic material is a lead sulfide, lead telluride, lead selenide or indium antimonide.

8. The touch panel of claim 1, wherein the color-changing cathode layer is transparent in its normal state.

9. The touch panel of claim 8, wherein a material of the color-changing cathode layer is tungsten oxide or viologen derivatives.

10. A touch display device, comprising:
    a display panel;
    a backlight module; and
    a touch panel, comprising:
       a substrate;
       a touch layer, positioned on the substrate and comprising a plurality of transmitter (Tx) electrodes and a plurality of receiver (Rx) electrodes; and
       a photochromic layer, positioned on the transmitter electrodes and connected to the transmitter electrodes, comprising:
          a photosensitive resistor layer, positioned on the transmitter electrodes and connecting to the touch layer; and
          a color-changing cathode layer, positioned on the photosensitive resistor layer,
          wherein the touch panel and the backlight module are respectively positioned on both sides of the display panel, and
          wherein an orthographic projection of the photochromic layer on the substrate is not overlapped with an orthographic projection of the receiver electrodes on the substrate.

11. The touch display device of claim 10, wherein the transmitter electrodes and the receiver electrodes arranged in a crisscross pattern on the substrate.

12. The touch display device of claim 11, wherein the photosensitive resistor layer comprises a plurality of photosensitive resistors, positioned in areas between the receiver electrodes and on the transmitter electrodes; the color-changing cathode layer comprises a plurality of color-changing cathodes; and each of the photosensitive resistors corresponds to one color-changing cathode of the color-changing cathodes.

13. The touch display device of claim 12, wherein the photosensitive resistors are positioned in the areas between the receiver electrodes as a matrix, and the transmitter electrodes, the photosensitive resistors and the color-changing cathodes are stacked.

14. The touch display device of claim 10, wherein a material of the photochromic layer is a ultraviolet (UV) photochromic material or an infrared photochromic material.

15. The touch display device of claim 14, wherein the UV photochromic material is zinc oxide, an alloy of zinc oxide and magnesium, cadmium sulfide or cadmium selenide.

16. The touch display device of claim 14, wherein the infrared photochromic material is a lead sulfide, lead telluride, lead selenide or indium antimonide.

17. The touch display device of claim 10, wherein the color-changing cathode layer is transparent in its normal state.

18. The touch display device of claim 17, wherein a material of the color-changing cathode layer is tungsten oxide or viologen derivatives.

* * * * *